(12) United States Patent
Robert et al.

(10) Patent No.: US 7,853,222 B2
(45) Date of Patent: Dec. 14, 2010

(54) SWITCH AND SWITCHING DEVICE WITH SELECTIVE ISOLATION FOR MULTIMEDIA TERMINALS

(75) Inventors: Jean-Luc Robert, Betton (FR); Philippe Minard, Saint Medard sur Ille (FR); Jean-Yves Le Naour, Pace (FR)

(73) Assignee: Thomson Licensing, Boulogne-Billancourt (FR)

(*) Notice: Subject to any disclaimer, the term of this patent is extended or adjusted under 35 U.S.C. 154(b) by 862 days.

(21) Appl. No.: 11/810,056

(22) Filed: Jun. 4, 2007

(65) Prior Publication Data
US 2008/0012783 A1 Jan. 17, 2008

(30) Foreign Application Priority Data
Jun. 12, 2006 (FR) .................................. 06 05222

(51) Int. Cl.
*H04B 7/02* (2006.01)
(52) U.S. Cl. .................... 455/101; 343/876; 455/13.3; 455/63.3
(58) Field of Classification Search ................ 455/101, 455/13.3, 63.3; 343/876
See application file for complete search history.

(56) References Cited

U.S. PATENT DOCUMENTS

| 5,969,560 | A | * | 10/1999 | Kohama et al. | ............. 327/308 |
| 6,023,615 | A | * | 2/2000 | Bruckert et al. | .......... 348/14.08 |
| 6,961,545 | B2 | * | 11/2005 | Tehrani et al. | ............... 455/101 |
| 2007/0072561 | A1 | * | 3/2007 | Weber et al. | ................. 455/101 |

FOREIGN PATENT DOCUMENTS

| EP | 0 625 831 A2 | 11/1994 |
| EP | 0 720 292 A1 | 3/1996 |
| EP | 0 978 949 A | 2/2000 |

* cited by examiner

*Primary Examiner*—Nay A Maung
*Assistant Examiner*—Angelica M Perez
(74) *Attorney, Agent, or Firm*—Robert D. SHedd; Jeffrey M. Navon

(57) ABSTRACT

The invention relates to a switch with selective isolation and also to a switching device with selective isolation for multimedia terminals. The switch formed by 2 transistors (T1, T2) is feedback controlled by a feedback control signal V tune at a pre-defined frequency thus guaranteeing the selective isolation at this frequency. The switching device for switching the transmission/receiver channels of a multimedia terminal is formed by selective isolation switches that can be integrated using MMIC technology.

8 Claims, 3 Drawing Sheets

SWITCH AND SWITCHING DEVICE WITH SELECTIVE ISOLATION FOR MULTIMEDIA TERMINALS

BACKGROUND OF THE INVENTION

1. Field of the invention

This application claims the benefit, under 35 U.S.C. §119 of French Patent Application 0605222, filed Jun. 12, 2006.

The invention relates to a switching device with selective isolation for multimedia terminals in the field of directive antenna systems required in the new wireless communications media allowing access to broadband high-data-rate services. They are situated within frequency bands currently allocated going from a few GHz for the applications of the WLAN type (2.4 GHz 802.11b, 4.9 GHz to 5.8 GHz 802.11a, 3.5 GHz Wimax) to a few tens of GHz for links of the LMDS type (28 GHz) or the satellite type (12-14 GHz or 20-30 GHz).

2. Description of the Prior Art

With the transmission techniques of the MIMO (Multiple Input Multiple Output) type, the systems use several antennas both in the transmitter and in the receiver systems in order to transmit or receive the signals. In the receiver, diversity selection allows the antenna having the highest level of received signal to be selected by switching, thus reducing the phenomena of fading. However, this design does not use all the power available to the antennas and the gain of the network remains limited.

Another transmission technique that is widely used is formed by networks of switched multi-beam antennas, which consists of a network of antennas comprising multiple fixed beams pointing in various directions. In this case, the design is relatively simple and the receiver has only to choose a correct beam for a few seconds.

With all these designs are associated a switching device that is more or less elaborate depending on the technique chosen. These devices can be formed by switches of the SPDT (Simple Port Doubles Throw) type for the simplest configuration of 2-antenna diversity or the SP4T type or the SpnT (Simple Port (n)×Throw) type for more elaborate MIMO devices where n is the order of the diversity/number of antennas used.

However, such RF/Microwave (2.4 with 5 GHz) switches require severe constraints over a wide band of frequencies:

in terms of insertion loss, in order not to degrade the noise factor too much and hence the performance in terms of sensitivity in the receiver and in order to limit the transmission power delivered by the output amplifiers, and in terms of isolation, in order not to degrade the gain of each of the multi-beam antennas.

Indeed, in the case of the use of a switch with low isolation between the access points, the radiation diagram resulting from the system of antennas which is weighted by the isolation of the switch loses the desired advantage in terms of reduction of interference with the other users, in other words the capacity of the antenna system to only cover one sector of the space.

But in the case of the use of a switch with high isolation between the access points, the resulting antenna diagram is the diagram of only one of the sectors or of one of the antennas of the system of antennas. This is why a high isolation between the access points is required and the switches must be very efficient.

The RF/Microwave switches currently on the market mainly using GaAs (Gallium Arsenide) and perfectly integrable into MMIC (Monolithic Microwave Integrated Circuit) technology typically use field-effect transistors (FET), the FET most commonly used is the N channel FET, called depletion FET, which has a very low drain-source resistance in the absence of gate voltage and however allows a high drain current (Idss) to flow, with the application of a negative voltage on the gate; the electric field developed under the gate induces a pinching of the channel thus notably increasing the source-drain resistance. This voltage, called Pinch Off Voltage, is around −2 to −2.5 V. They provide isolations of about 20 dB to 25 dB between channels, but this remains insufficient in the case of sectorized antennas if it is desired to maintain a high directivity gain.

Moreover, the performance of such components is nevertheless tending to becoming more critical in terms of insertion losses and isolation with the rise in frequency of the applications (2.4 to 5 GHz).

It is known from the prior art that the isolation of a switch, for example a switch using GaAs FETs, can be improved by using the resonance of the stray drain-source capacitance Cds of the FET transistor at the frequency under consideration. FIG. 1 shows an example of such a switch. This conventional design and its effectiveness are now described:

The source of the transistor T1 is connected to the input terminal E of the switch via a capacitor C1, whereas the transistor drain is connected to the output terminal S via another capacitor C2. The gate is connected via a resistor R2 to a control input C. A resistor R1 is connected between the source and the mass. An inductor L is connected between the source and the drain of the transistor.

The DC component of the input signal is filtered by the capacitors C1 and C2. The inductor L will form a resonant circuit with the residual capacitance Cds of the transistor at the frequency under consideration. The residual capacitor is of the order of 0.1 to 0.5 pF depending on the performance characteristics of the transistor T1.

The voltage Vctrl applied to the control input C allows the opening or closing of the switch according to the value of this voltage.

Such a switch provides isolations of about 20 dB between channels. This remains insufficient in the case of sectorized antennas if it is desired to maintain a high directivity gain.

In order to overcome these drawbacks, the invention provides an isolating switch formed from first and second transistors. The first transistor providing the switching function is voltage controlled and is connected, by the centre point P of an impedance bridge formed between the drain and the source of the said first transistor, to the gate of the second transistor which is itself controlled by a feedback control signal at a pre-defined frequency.

This switch has the advantage of substantially improving the isolation of the switch, in a selective manner, by guaranteeing the isolation no longer at the level of the transmission (reception) band as a whole but directly on the scale of a channel, for example, and by providing an excellent isolation of around a minimum of 30 dB between input and output channels.

Preferably, since the multimedia terminal comprises a local channel frequency oscillator, the feedback control signal is a signal coming from the said local channel frequency oscillator of the transmission terminal.

Preferably, the switches are able to be integrated using MMIC technology.

SUMMARY OF THE INVENTION

The invention also relates to a transmission system with a plurality of antennas comprising, associated with the antennas, a high frequency switching device allowing only one of the receiving or transmission antennas to be switched.

According to a variant of the invention, the transmission system is a system with an antenna with a plurality of sectors comprising, associated with the various sectors, a high frequency switching device allowing only one of the receiving or transmission sectors to be switched and guaranteeing a high isolation between the various channels associated with the sectors.

BRIEF DESCRIPTION OF THE DRAWINGS

The features and advantages of the aforementioned invention, together with others, will become more clearly apparent upon reading the following description, presented in relation to the appended drawings, in which.

Since the circuit according to the prior art has been previously summarily described, it will not be described again hereinafter.

In order to simplify the description, the same references will be used in these last figures to denote the the elements providing identical functions.

DESCRIPTION OF THE PREFERRED EMBODIMENTS

Figure 1:
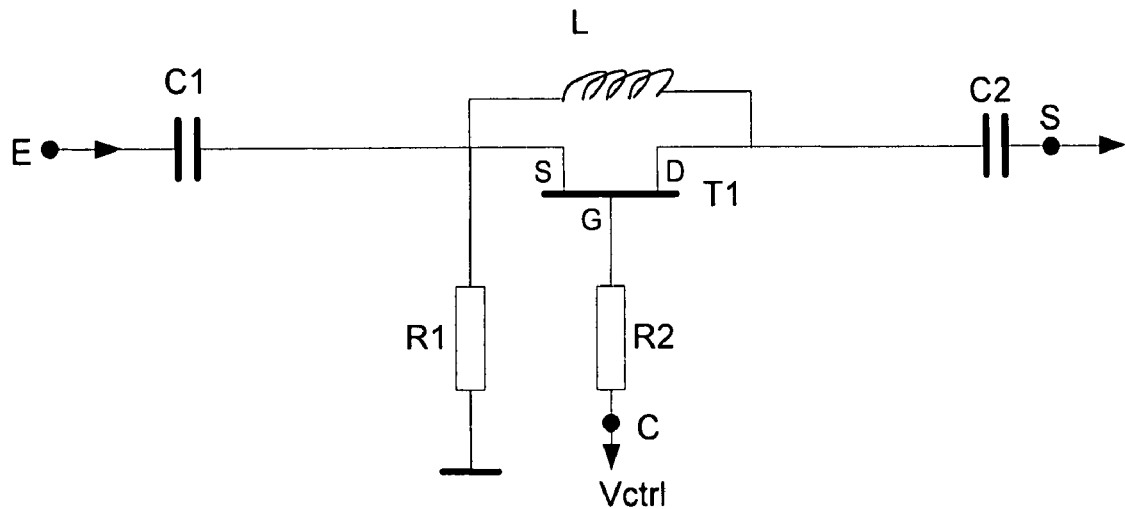
FIG. 1, already described above, shows an exemplary circuit diagram of a switch using an FET transistor according to the prior art.
Figure 2:
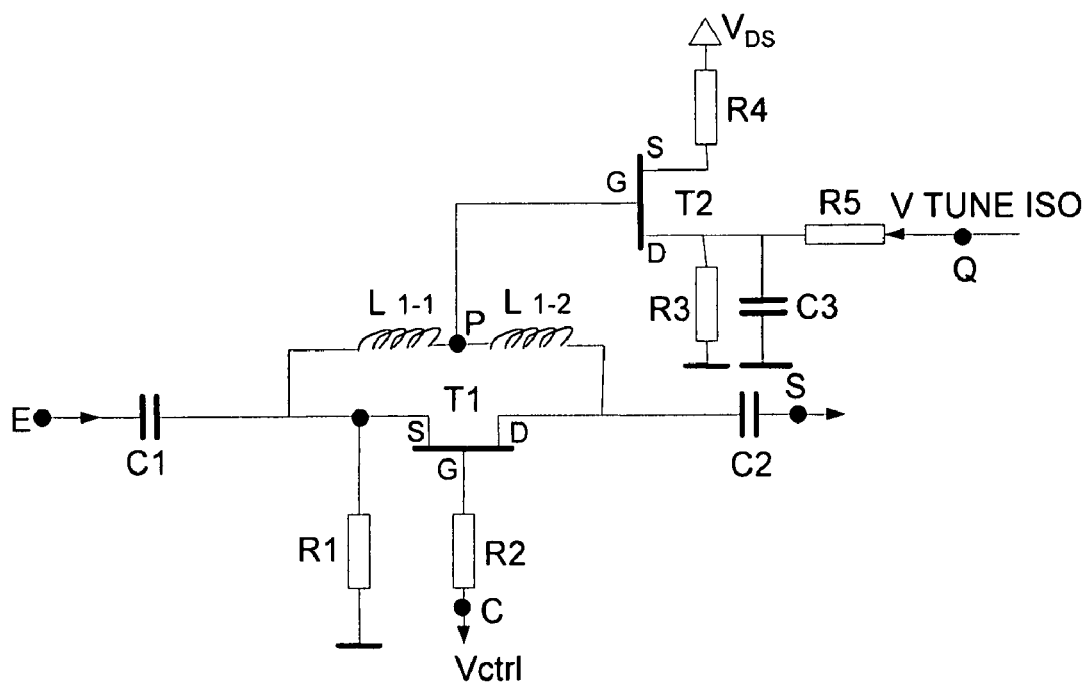
FIG. 2 shows an exemplary topology of the switch according to the invention.

The design according to the invention is illustrated in FIG. 2, the transistor T1, for example of the GaAs FET type or of the MESFET type provides the switching function as previously described with the aid of FIG. 1. The impedance L, connected between the source and the drain of the first transistor T1, is separated into 2 impedances L1-1 and L1-2 connected at a point P. This impedance centre point is connected to the gate of the second transistor T2, of the same type as T1, which is implemented using common-source topology. A control voltage Vds is applied to the source of the second transistor T2 via a resistor R4 and allows the voltage VGS of the second transistor, and, consequently, the bias point of the latter, to be modified. The drain of the transistor T2 is connected to a control terminal Q via a resistor R5. A resistor R3, connected in parallel with a capacitor C3, connects the drain of the transistor T2 to ground.

With a zero control voltage Vctrl on the gate, the transistor T1 has a very low Drain-Source resistance and the transistor is therefore conducting (ON). In contrast, for a control voltage Vctrl of around (−2 v) applied to the gate, the transistor T1 is open (Vgate=Vpinch off), the 2 inductors L1-1 and L1-2 resonate with the Drain-Source stray capacitance Cds of the transistor T1 of the FET type at the frequency of the RF signal applied to the input E. Simultaneously, the source control voltage V tune applied to the control terminal Q of the transistor T2 will modify the capacitance Cgs of the transistor T2 presented between the common point of the inductors and the power supply reference (ground), the very low capacitance added of about 0.1 to 0.7 pF having the effect of modifying the resonant circuit formed from the inductors L1-1 and L1-2 and the capacitance Cds of T1. By feedback controlling the control voltage on the channel frequency of a transmitter/receiver system, in other words by applying as control voltage on the second transistor the voltage produced by the local oscillator used for the selection of channel frequency, it is thus possible to apply a selective isolation, depending on the channel frequencies, guaranteeing the isolation at this frequency.

Figure 3:
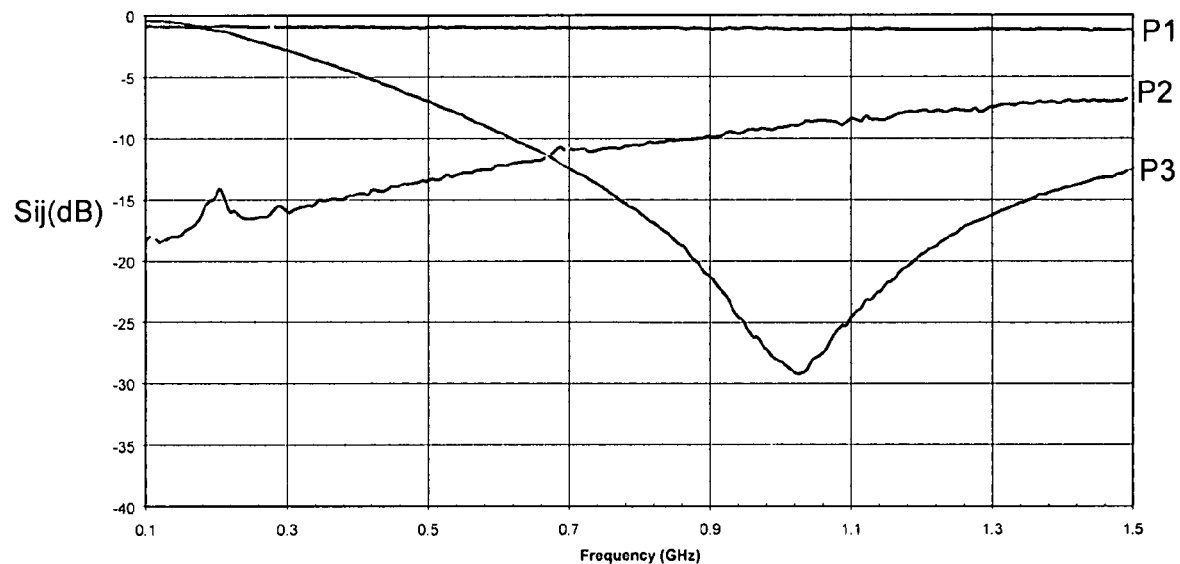
FIG. 3 is a graph showing the measured performances of the switch with and without optimization.

FIG. 3 is a graph showing the measured performances of two switches Ti and Tj with optimization, in other words with the switch of the design according to the invention, or without optimization, in other words with the switch of the prior art shown in FIG. 1. This graph therefore shows the isolation Sij (in dB) between the switches Ti and Tj for a selected tuner frequency of 1 GHz. The first reference curve f1 shows the zero attenuation between the antennas when the latter are connected by closed switches (switch on). The second curve f2 shows the attenuation Sij between the antennas when they are separated by at least one switch according to the prior art (switch off). The attenuation reaches an insufficient minimum value of −15 dB towards the selected tuner frequency. This second curve makes it possible to highlight the advantages of the invention. Indeed, with reference to the third curve showing the attenuation Sij between the antennas when they are separated by at least one switch according to the invention, the attenuation reaches a value of −30 dB for a frequency approaching that of the selected tuner frequency of 1 GHz. The isolation of this switch according to the invention is therefore quite selective according to the frequency of the selected band.

Figure 4:
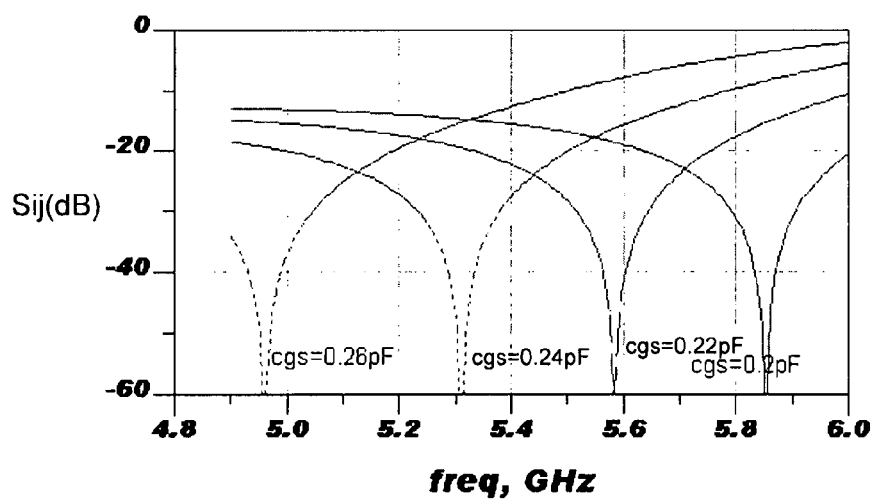
FIG. 4 is a graph showing the isolation within the 5 GHz band for values of gain-source capacitance Cgs from 0.1 to 0.3 pF.

The graph in FIG. 4 is a set of 2 curves showing the isolation Sij in dB within the 5 GHz frequency band for values of gain-source capacitance Cgs of the transistor T2 equivalent to values going from 0.20 to 0.26 pF. They therefore illustrate an example of performances obtained in simulation for applications at 5 GHz. For example, it is noted that for a stray capacitance of the transistor T1 of 0.3 pF, a very small variation of the capacitance Cgs of the transistor T2 is enough in order to ensure a selective isolation over the whole 802.11a band (4.9-5.875 GHz).

Figure 5:
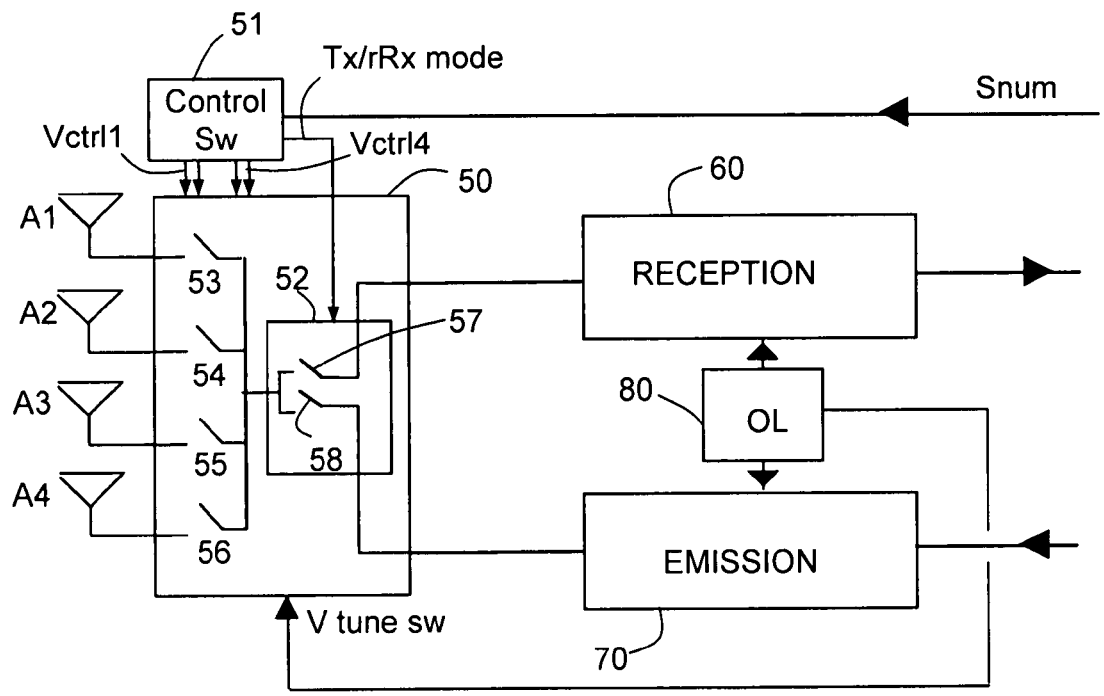
FIG. 5 shows an application embodiment of the switch according to the invention in a transmission system with a diversity of antennas.

FIG. 5 shows a multimedia terminal for a transmission system with a plurality of antennas. It comprises a switching device 50 formed by 4 switches 53 to 56 for signals coming from the antennas A1 to A4 and a selector 52 formed by the switches 57, 58 for selecting the transmitter or receiver mode. Each switch 53-56 of the device is connected, on the one hand, to one of the channels connected to the antennas A1-A4 and, on the other, to the transmitter/receiver mode selector 52.

A control element 51 emits a TX/RX mode signal in order to select the transmitter or receiver mode of the terminal comprising a receiver circuit chain 60 and a transmitter circuit chain 70. Similarly, it emits the control signal Vctrl 1-Vctrl 4 for the various switches depending on a digital signal Snum produced by the terminal. This signal delivered by a signal processing circuit, not shown, allows the transmitter or receiver mode and one of the antennas to be selected according to various criteria. The criteria are known to those skilled in the art and can, for example, be a power measurement of the transmitted or received signal, a measurement of the noise or of the output power signal-to-noise ratio.

The control voltage V tune, applied to each switch such as is described by FIG. 2, is produced by the local oscillator 80 associated with the known data transmission circuits for the receiver 60 and the transmitter 70. This feedback control at the channel frequency guarantees the isolation Sij sought between the various channels.

Similarly, the multimedia terminal can also be associated with a system with an antenna with a plurality of sectors comprising, associated with the various sectors, a high-frequency switching device 50 allowing only one of the receiving or transmission sectors to be switched and guaranteeing a high isolation between the various channels associated with the sectors.

Figure 6:
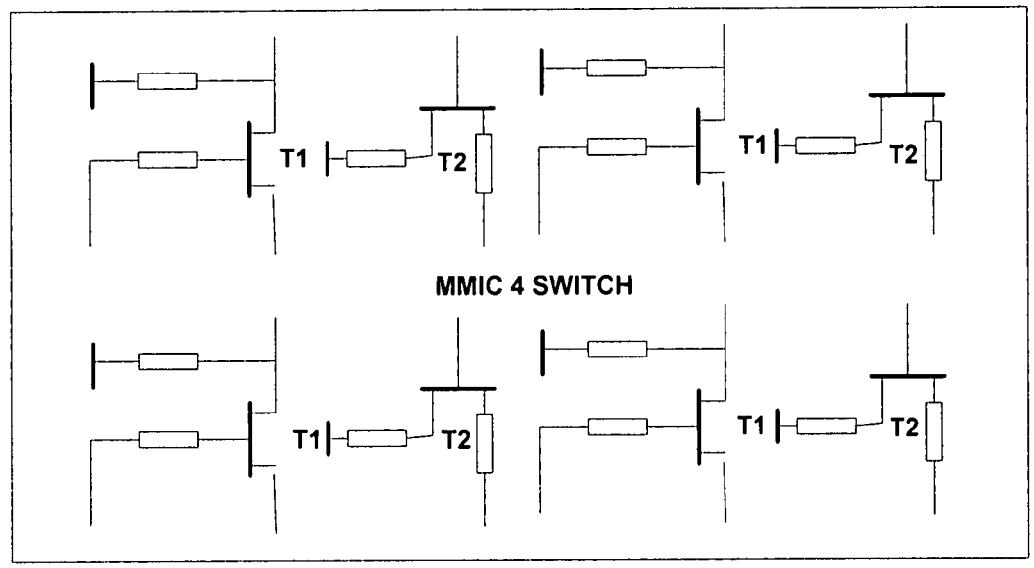
FIG. 6 is an exemplary implementation of switches in an MMIC design.

As is shown by the example in FIG. 6, it is possible for at least four pairs of transistors T1, T2, together with the corresponding resistors, to be integrated using MMIC technology in order to form at least 4 switches according to the invention. The inductors and capacitors may not be integrated and remain to be connected externally to the circuits in order to form the switches 53-56 of the switching device 50 described in the preceding figure.

Other variants of the invention are possible. The examples previously described show a reception of the modulated signal by a plurality of antennas, but a reception by antennas with a plurality or diversity of beams or antennas with a diversity of sectors may also be envisaged.

The invention is not limited to the embodiments described and those skilled in the art will recognize the existence of numerous variant embodiments of the invention.

The invention claimed is:

1. Isolating switch formed by a first transistor and a second transistor wherein the first transistor (T1) providing the switching function is voltage controlled and is connected, by the centre point P of an impedance bridge formed between the drain and the source of the said first transistor, to the gate of the second transistor (T2) which is itself controlled by a feedback control signal at a pre-defined frequency.

2. Isolating switch according to claim 1, wherein the first and second transistors are of the GaAs FET type.

3. Isolating switch according to claim 1, wherein the first and second transistors are of the MESFET type.

4. High-frequency switching device with at least 2 transmission/receiving channels of a multimedia terminal, wherein it comprises, associated with each channel, a channel isolating switch such as is claimed in claim 1.

5. High-frequency switching device according to claim 4, wherein, since the multimedia terminal comprises a local channel frequency oscillator, the feedback control signal is a signal (V tune) coming from the said local channel frequency oscillator of the transmission/receiving terminal.

6. Switching device according to claim 1, wherein the switches are able to be integrated using MMIC technology.

7. Transmission system with a plurality of antennas comprising, associated with the antennas, a high frequency switching device, such as is claimed in claim 4, allowing only one of the receiving or transmission antennas to be switched.

8. Transmission system with an antenna with a plurality of sectors comprising, associated with the various sectors, a high frequency switching device, such as is claimed in claim 4, allowing only one of the receiving or transmission sectors to be switched.

* * * * *